United States Patent Office 3,526,093
Patented Sept. 1, 1970

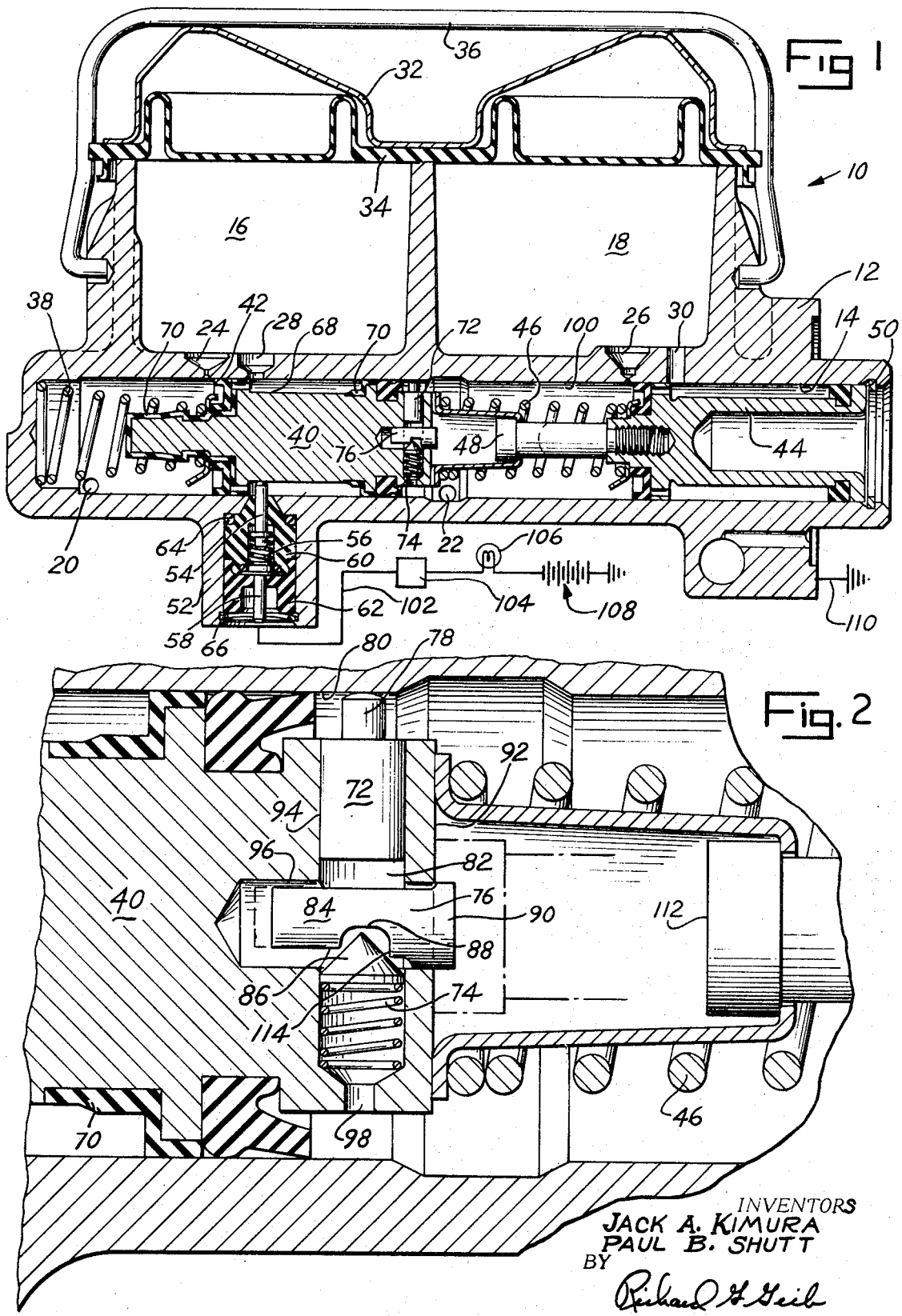

3,526,093
SWITCH MEANS FOR SPLIT MASTER CYLINDERS
Jack A. Kimura and Paul B. Shutt, St. Joseph, Mich., assignors to The Bendix Corporation, a corporation of Delaware
Filed Jan. 15, 1969, Ser. No. 792,902
Int. Cl. F15b 7/08; H01h 35/38; B60t 11/20
U.S. Cl. 60—54.6    11 Claims

ABSTRACT OF THE DISCLOSURE

A switch means for a closed circuit indicating means which includes a first switch contact to a piston means and a second switch contact from the latter to a housing of a master cylinder, which second switch contact has a contact that is radially reciprocable and operated by, as well as held in place by, an axially reciprocable plunger.

SUMMARY

Federal safety standards for automobiles has required that they employ split master cylinders. Also, it is required that the split master cylinders be provided with some means to indicate whether a failure is imminent. Most of the prior art devices observed so far for doing this have incorporated means to utilize the separate pressures delivered by the master cylinders across a piston type switch means so that when there is a differential of a predetermined value between the separate pressures, a warning light will be illuminated on the dash of the vehicle to indicate to the operator that his brake system needs checking.

It has been noticed recently that there are some suggestions within the prior art of incorporating such a warning means within a master cylinder, for example, U.S. Pat. No. 3,393,514, assigned to the common assignee of this invention. It is a principal object of this invention to improve upon this latter type of indicating means for split master cylinders by providing a much more simple switching means that is economical in manufacture.

It is still another object of this invention to provide a switching means within a master cylinder that is adapted to operate to open an electrical circuitry for a signal producing means that will in turn illuminate a light which may be placed in the view of the operator of the vehicle, which incorporates simple spring biased plungers in relation to one of the pistons of the split master cylinder, such that the electrical circuitry can be opened by any one of the plungers or switch contacts, as they may be termed.

DRAWING DESCRIPTION

Other objects and advantages of this invention will appear to those skilled in the art from the following description of the drawings in which:

FIG. 1 is a cross sectional illustration of a master cylinder incorporating the switching means of this invention; and FIG. 2 is an enlarged cross sectional detail of one of the switching elements as seen in FIG. 1 in the rear of the floating piston for the split master cylinder.

DETAILED DESCRIPTION

With reference to FIG. 1, there is shown a common type of split master cylinder 10 having a body 12 which is provided with a longitudinal bore 14 and separate reservoir cavities 16 and 18. The bore 14 is provided with spaced outlets 20 and 22 as well as compensating passages 24 and 26 and filler passages 28 and 30 between the respective reservoirs 16 and 18 and the bore 14. The reservoirs 16 and 18 are closed by means of a cover 32 and diaphragm seal 34 held in place by means of a bail 36. Within the bore 14 a return spring 38 that has been assembled to a floating piston 40 is utilized to maintain the released position of seal 42 for the floating piston 40 immediately behind and adjacent the compensating port 24. An operator-operated piston 44 having a caged spring 46 assembled thereto by means of a caging bolt 48 is inserted behind the floating piston 40 and held in the bore 14 by means of a snap ring 50.

The housing 10 is provided, in a preferred form, with a boss 52 in which a preassembled switching means comprised of a contact 54, a spring 56 and a connector 58 within plastic housings 60 and 62 is assembled with a seal 64 at one end and a snap ring 66 holding the assembly at the other. Spring 56 will maintain the contact 54 riding on the metal intermediate body 68 of piston 40 which is coated with an insulator material 70 ahead of and behind the surface 68 on which the contact 54 is resiliently biased. Another switch contact 72 is urged by a spring 74 preloaded by means of a forked plunger 76 to ride against the walls of the bore 14 under normal conditions. This assembly is seen in greater detail in FIG. 2 showing a projection 78 for the contact 72 having a spherical head riding along wall 80. The contact 72 is provided with slots or openings 82 on each side thereof about which legs 84 of the forked plunger 76 may be inserted, such that the ramp or conical cam 86 is normally positioned within a slot 88 of the forked plunger 76. Spring 74 maintains the cam 86 within the slot 88 such that head 90 of the plunger 76 will be extending beyond the rear face 92 of the floating piston 40. The floating piston 40 is provided with drilled openings 94 and 96 to permit assembly of the contact 72 and plunger 76. In addition, a passage 98 is provided leading into the openings 94 and 96 so as to make sure that fluid pressure in primary chamber 100 is equal on all sides of the contact 72 and plunger 76.

Referring back now to FIG. 1, there is shown schematically connected with the connector 58 an electrical lead 102 leading to an electrical switching means 104 for controlling illumination of light 106 connected also to the vehicle battery 108. Housing 12 is grounded by the connection 110 provided when it is installed in the vehicle.

OPERATION

In operation the operator will depress a brake pedal (not shown) to reciprocate piston 44 and via spring 46 piston 40 so as to develop separate pressures for outlets 20 and 22. So long as the brake system is operating normally, the stroking of the floating piston 40 will not be sufficient to interpose insulator 70 between contact 54 and the floating piston intermediate body 68. Furthermore, in normal operation, the relative movement between piston 44 and piston 40 will not be such as to move head 112 into engagement with head 90 of the forked plunger 76.

However, in the event that a brake line should be leaking and the floating piston 40 should be caused to move an abnormal distance within the bore 14 the break in the electrical circuit that would trigger the electrical switching means 104 would be caused by interposing insulator 70 between the contact 54 and the electrically conductive surface 68 of floating piston 40.

Likewise, if a leak should appear in another line which would be receiving pressure from the port 22, the relative movement of piston 44 with respect to piston 40 would be such as to abut the head 112 of the caging bolt 48 on the head 90 of the forked plunger 76. This will cause shoulder 114 to ride up the ramp or cone type cam 86 to bring the contact 72 downwardly to remove projection 78 from the wall surface 80 of bore 14. The electrical circuit is then open and the electrical switching means 104 would energize to close the circuit to light 106 and again illuminate same to provide the operator with an indication of a need to have the brake system checked.

We claim:

1. In a master cylinder having first and second piston means reciprocatorily arranged in a common bore and positioned by spring means, a means to complete an electrical circuit therewithin, said means comprising:
   a first contact for said first piston including a connector exteriorly of the bore for connection with the electrical circuit;
   means on said first piston for opening said first contact whenever said first piston has stroked a greater distance than desired;
   a second contact in said first piston including a radially reciprocable element and an axially reciprocable operator for said element; and
   a means on said second piston for operating said operator whenever said second piston has travelled an abnormal amount relative to said first piston.

2. The structure of claim 1 wherein said second contact is arranged so as to be surrounded by equal hydraulic pressure such that it is unaffected thereby.

3. The structure as defined in claim 1 wherein said second contact is further characterized by said element having a projection biased by a spring to slidably engage the wall of the bore and an opening within which the operator is inserted to assemble the element and operator to the first piston, said opening having a cam surface for riding on said operator such that inward reciprocation of said operator will withdraw said projection from the walls against the action of said spring.

4. The structure as defined in claim 2 wherein said second contact is further characterized by said element having a projection biased by a spring to slidably engage the wall of the bore and an opening within which the operator is inserted to assemble the element and operator to the first piston, said opening having a cam surface for riding on said operator such that inward reciprocation of said operator will withdraw said projection from the walls against the action of said spring.

5. The structure as defined in claim 1, wherein the spring means is a caged spring assembly having a caging bolt mounted on said second piston said caging bolt being the means for operating the operator.

6. The structure as defined in claim 2, wherein the spring means is a caged spring assembly having a caging bolt mounted on said second piston said caging bolt being the means for operating the operator.

7. A master cylinder comprising:
   a housing;
   an operator-operated piston in a bore of the housing;
   a floating piston in the bore ahead of said operator-operated piston;
   a spring between the end of the bore and the floating piston;
   a caged spring between the operator-operated piston and said floating piston said caged spring being connected to the former of these pistons by a caging element;
   first switch contact means affixed to said floating piston on its rearward end, said means having a radially reciprocable contact biased by a spring to slidably contact the housing about the bore, and an axially reciprocating plunger assembling the contact to the floating piston, which plunger is aligned with said caging element and normally spaced therefrom;
   insulating means on said floating piston except for a limited length of its intermediate body to electrically insulate said floating piston from the housing; and
   second switch contact means insulatedly supported by said housing and having a contact resiliently urged within said bore to normally ride on the limited length of the intermediate body of said floating piston to complete an electric current path to said first switch means thence to said housing, said contact of said second switch means being adapted to break said path by riding on said insulating means during abnormal travel of said floating piston and said caging means upon abnormal relative movement of said operator-operated piston with regard to said floating piston being adapted to reciprocate said plunger to withdraw the contact of said first switch means from said housing whereby the current path can also be interrupted in this manner.

8. The structure of claim 7 wherein said radially reciprocable contact has an axial opening at its lowermost end with a cam means projecting upwardly to engage an underlying contoured surface of said plunger whereby its longitudinal movement is transposed to vertical movement for said contact.

9. The structure as defined in claim 7 and further characterized by means to suspend said first switch means in the fluid pressure between said operator-operated piston and said floating piston.

10. The structure as defined in claim 8 and further characterized by means to suspend said first switch means in the fluid pressure between said operator-operated piston and said floating piston.

11. A split master cylinder having a caged spring for piston means including a first movable wall and a second movable wall which second movable wall is insulated from a bore wall of a housing for the master cylinder, said first wall and said second wall being within the bore arranged to develop separate fluid pressures for separate fluid outlets provided in spaced relation for said housing and a switch means having a portion for connecting an electrical circuitry to one of said piston means and through the housing to complete same, which switch means is characterized by the improvement of a switch to open said circuitry upon abnormal relative movement of said piston means, said switch comprising:
   a radially reciprocable element that includes a transverse opening with ramp cam surface from one side of the opening towards the central axis of the element;
   a spring between said piston means and said element to bias it outwardly into sliding contact with the walls of the bore; and
   an axially reciprocable plunger slidable within said opening to preload said spring and hold said element within said piston means, said plunger having a cam operator surface adjacent said ramp cam surface and a head in alignment with a projection from the piston means to be operable thereby upon the abnormal relative movement to withdraw the element from contact with the bore walls thereby interrupting the electrical circuitry to indicate such abnormal travel.

References Cited

UNITED STATES PATENTS

| | | |
|---|---|---|
| 2,965,730 | 12/1960 | Regoli et al. |
| 3,393,514 | 7/1968 | Cripe. |
| 3,412,557 | 11/1968 | Williams. |
| 3,448,579 | 6/1969 | Reznicek. |

MARTIN P. SCHWADRON, Primary Examiner

R. R. BUNEVICH, Assistant Examiner

U.S. Cl. X.R.

188—151, 152; 200—82.3